Oct. 11, 1949.　　　B. L. NOETH　　　2,484,309
VACUUM JAR
Filed June 30, 1947

INVENTOR.
BERNICE L. NOETH.
BY
Oltsch + Knoblock.
ATTORNEYS

Patented Oct. 11, 1949

2,484,309

UNITED STATES PATENT OFFICE 2,484,309

VACUUM JAR

Bernice L. Noeth, South Bend, Ind.

Application June 30, 1947, Serial No. 758,153

8 Claims. (Cl. 215—13)

This invention relates to improvements in vacuum jars.

Workmen, picnickers and travelers who carry lunches have been limited heretofore, with respect to the solid foods which they could carry, to foods in cold state if the foods were packed in small quantities, or to resort to the use of large and cumbersome equipment suitable only for large quantities of food if they desired the food to be at a temperature other than atmospheric temperatures. In referring to solid foods it is understood that no reference is intended to liquids since the well known vacuum bottles have provided means by which small quantities of liquids could be preserved at desired hot or cold temperatures over long periods of time. Such conventional vacuum bottles have not been suited to the preservation of solid foods because of their construction with a neck or mouth of restricted cross-sectional area.

It is the primary object of this invention to enable the packing of small quantities of solid foods in a manner substantially to preserve the desired temperature thereof and to facilitate the removal of the food when the user is ready to consume it.

A further object of the invention is to provide a food container, having a removable cover, constituting a storage compartment which is substantially completely and continuously sheathed by evacuated enclosing wall structures when sealed and which has a large and substantially unrestricted access opening for insertion of and removal of solid foods when the cover or lid is removed.

A further object is to provide a device of this character which is simple, inexpensive and sturdy in construction.

Other objects will be apparent from the following specification.

Figure 1:
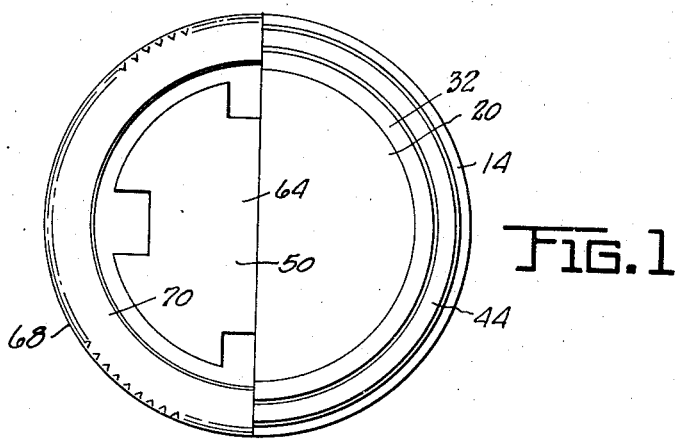
Fig. 1 is a top plan view of the device illustrating the cover applied thereto at the left side of the figure and the cover removed at the right side of the figure.
Figure 2:
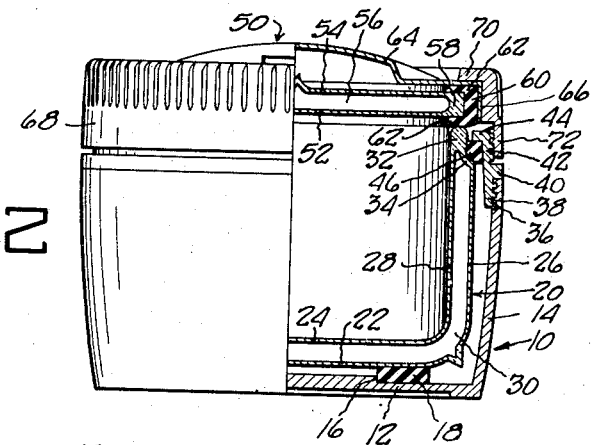
Fig. 2 is a side view of the device with parts broken away and illustrated in section.

Referring to the drawing, and particularly to Figs. 1 and 2 thereof, the numeral 10 designates a cup-like shell having a base 12 and a substantially cylindrical side wall 14. The sheath 10 is preferably formed of metal or other substantially shock and impact resisting material such as plastic. The bottom 12 preferably has a shoulder 16 formed therein concentric therewith and projecting upwardly at the interior of the shell. A rubber or other resilient ring 18 bears upon the bottom 12 and against the shoulder 16 to be positioned in desired centered relation within the shell.

A cup-like insert 20 is mounted within the sheath 10. This insert is preferably formed of glass and has an outer bottom wall 22 and an inner bottom wall 24 spaced apart and merging respectively at its margin with an outer substantially cylindrical wall 26 and an inner substantially cylindrical wall 28. The walls 26 and 28 are preferably spaced the same distance that the bottom walls 22 and 24 are spaced and provide a hollow cavity 30 within the insert 20, as best shown in Fig. 2. The rim of the insert is defined by a solid portion 32 integral with the inner wall 28 and of lesser thickness than the thickness of the inserts at the walls 26 and 28, there being a downwardly outwardly flaring integral portion 34 formed integrally with the rim 32 and with the upper end of the outer wall 26 of the insert. In the construction shown in Fig. 2 the inner surface of the side wall 28 and the inner surface of the marginal lip 32 are of substantially the same diameter throughout. The hollow cup-shaped insert 20 constructed as above has air evacuated from the cavity 30 therein in the manner well understood in the art.

The wall 14 of the sheath 10 is internally screw-threaded at 36 to receive an externally screw-threaded cylindrical flange 38 of a ring which may be formed of metal, plastic or any other material. This ring has a thickened portion 40 intermediate its ends providing a shoulder which is adapted to bear against the top edge of the wall 14 of the sheath. An upper externally screw-threaded cylindrical flange 42 is formed on the ring above the central enlargement 40, being substantially of the same diameter as the flange 36. An inwardly projecting annular flange 44 projects from the upper end of the ring portion 42. The flange 44 is positioned in spaced relation above the flaring portion 34 of the insert 20, and a resilient gasket ring 46 is applied around the insert 20 to seat against the flaring portion 34 of the outer wall thereof and in turn to be pressed upon by the flange 44. The interior diameter of the flange 44 is greater than the external diameter of the marginal lip 32 of the insert to space these parts out of contact, and the only contact between the insert 20 and the shoulder 14 and its related parts is effected by the resilient gaskets 18 and 46 respectively. In this manner it will be observed that the insert 20 is mounted firmly and fixedly within the sheath 10 when the ring 36—44 has been mounted upon the sheath 10 in the manner illustrated. Thus the sheath serves its desired protective function to protect the insert against impact, and the insert is held by the gaskets 18 and 46 against movement within the sheath.

The device is provided with a sealing lid or cover 50 which includes a vacuum insulating panel formed of glass or like material having an inner wall 52 and an outer wall 54 which are spaced apart to provide a chamber 56 therebetween, the margin of said inner and outer walls being joined by an integral comparatively thick portion 58. Air is substantially completely evacuated from the chamber 56 to provide a vacuum within this glass lid portion. A resilient gasket ring 60, preferably of U-shape in cross-section as illustrated in Fig. 2, fits around the marginal portion 58 of the insulating glass lid with flange portion 62 bearing against opposite faces of said glass lid. A sheath or protective member 64, which is preferably formed of metal and which may be suitably configured as by provision of the central portion thereof slightly comed or concavo-convex configuration, spans the vacuum glass top bearing against one of the flanges 62 of the gasket 60. The sheath 64 is preferably provided with a cylindrical marginal flange portion 66 which fits around the body of the resilient ring 60 in a manner to retain the same and the glass vacuum insert of the lid in desired assembled relation as shown. A ring 68 which may be formed of metal, plastic or any other suitable material adapted to withstand impact, fits around the marginal flange 66 of the cover sheath 64. This ring 68 preferably has an inturned flange 70 formed at its top adapted to bear upon the marginal portion of the top sheath 64. The ring includes a skirt portion 72 which is internally screw-threaded to mesh with the threads of the upper flange portion 42 of the insert retaining ring carried by the body sheath 10 of the device. The ring 68 forms means for retaining and anchoring the top unit or assembly to the bottom or body unit or assembly of the device and is separable from said top unit, although it may be an integral part of the top unit if so desired. Formation of the ring 68 separate from the top unit is preferred, however, so that the top unit need not rotate with the ring 68 incident to the threading of the skirt 72 upon the threads of the ring portion 42 of the body.

As best seen in Fig. 2, the inner or bottom flange 62 of the resilient ring 60 of the top unit is of such size and diameter that it bears against the top of the portion 32 of the glass insert 20. This provides a positive seal between the vacuum cup portion 20 and the evacuated lid portion. Thus, except for the thickness of the flange 62 of the ring 66 which separates the portion 58 of the vacuum lid and the rim 32 of the vacuum cup, the interior of the device is completely lined with the glass or other material of which the cup-shaped body insert or liner and the top body or insert are formed. Assuming that the ring 68 is separate from the lid, it will be observed that as its skirt 72 is threaded upon the threaded flange 42 carried by the body, a direct downward pressure is exerted upon the top, tending to compress the flange 62 of the sealing ring 60 to effect the seal. There is no tendency in such a construction for the ring 62 to rotate. This increases the life of the device and makes possible the application of sealing pressure without distortion or wear of the resilient sealing ring.

It will be observed that when the lid unit is applied to the body unit with the gasket held sealed therebetween by the engagement of the ring 68 with the threaded ring portion 42, the container is effectively sealed against leakage of any liquid component of its contents. In addition an effective heat insulating condition is provided by reason of the almost continuous lining of the device by the double walled evacuated glass inserts in the body and lid portions thereof. Thus heated foods may be retained within the device for long periods of time without substantial cooling thereof when the device has been properly sealed, or conversely chilled foods may be retained without substantial warming thereof for long periods of time. It will also be observed that this device has no restriction which will hinder the insertion of solid foods, such as cooked meats or vegetables, therein, and that such foods may easily be removed from the container. Thus the device may serve as a container in which the user can carry solid food in a given heated condition, and from which he may consume the food directly without requiring the use of extra dishes. The construction is sturdy and the evacuated parts thereof are all protected against direct contact with the sheath parts by the resilient gaskets interposed between the same and such sheath parts. The resilient gaskets in turn are all of such size and have such a fit in their mounting members that they absorb any impact or jar to which the device may be subjected and prevent loose play of the glass inserts relative to the sheaths.

Figure 3:
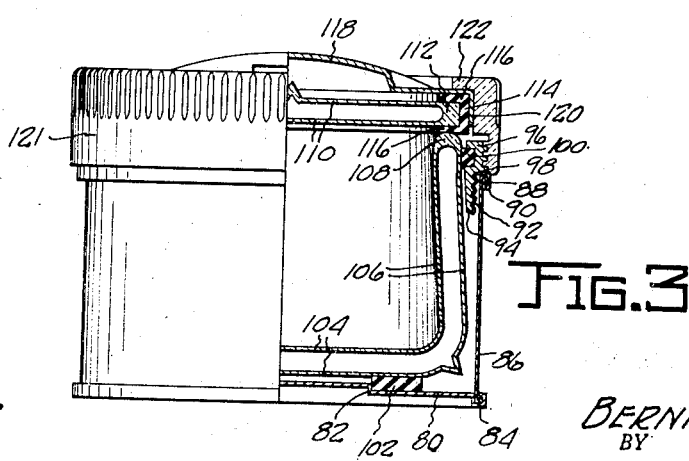
Fig. 3 is a side view of a modified form of the invention with parts broken away and illustrated in section.

A slightly modified embodiment of the invention is illustrated in Fig. 3. In this construction the body sheath of the device is formed of sheet metal, including a bottom 80 upwardly and inwardly dished at its center to provide the shoulder 82 and having an interfolded joint 84 with a cylindrical side wall 86 likewise formed of sheet metal. The upper edge or margin of the cylindrical side wall 86 is provided with a return bent flange 88 which interlocks with an outer flange portion 90 carried by a ring 92 which is positioned within the wall 86 and is configured to provide a screw thread. An externally threaded skirt portion 94 has a threaded fit with the metal ring 92 and depends from a ring 96 of slightly larger diameter to provide a shoulder 98 bearing upon the top of the ring 92. The ring 96 is externally screw-threaded and is provided with an annular groove or socket in its inner face to receive a gasket ring 100 which preferably has a smaller diameter than the inner diameter of the skirt 94 of the ring 96.

A gasket ring 102 bears upon the bottom 80 and fits around the shoulder 82 thereof in proper centered relation to support the bottom of a double walled evacuated cup-shaped glass insert having a bottom portion 104 and a wall portion 106. The wall portion 106 terminates at its upper edge in a solid marginal portion 108 and the cavities of the bottom 104 and the wall 106 communicate with and are suitably evacuated. The wall portion 106 preferably tapers slightly upwardly and inwardly whereby the mouth of the cup-shaped insert is of slightly less diameter than its major transverse diameter. The gasket ring 109 is of a diameter to fit snugly around the outer surface of the marginal or open upper end portion of the cup-shaped insert, and the insert is prevented from release by its slightly conical or tapered configuration.

A double walled glass insert 110 having a sealed glass margin 112 is adapted to span the mouth of the cup-shaped insert in the body of the device and is encircled by a resilient ring 114 having flanges 116 bearing against opposite faces of the margin of the top insert 110. The lower or inner flange 116 is of a size and shape to bear directly against the marginal edge portion 108 of the cup-shaped body insert. A metal cover sheath 118, preferably domed as shown, spans the glass evacuated panel 110 and is provided with a flange 120 embracing the resilient ring 114 and serving to hold the same and the glass insert 110 as a unit. A retainer ring 121 has a skirted internally screw-threaded portion adapted for threaded engagement with the ring 96, and further having an inturned flange 122 bearing against the margin of the top sheath 118 to apply a downward pressure against the gasket 114, 116 when said retainer is threaded upon the body ring 96.

It will be apparent that this construction has the same advantages as the embodiment previously described with the exception that there is a very slight and practically negligible taper or restriction of the glass liner of the device. As shown, the amount of this restriction may be so small as to be practically unnoticed and will not interfere with the insertion of a fork or a spoon into the glass liner for the purpose of removing solid foods, such as pieces of meat or vegetables, from the device in its use.

While the preferred embodiments of the invention have been described and shown herein, it will be understood that changes in the construction may be made within the scope of the appended claims without departing from the spirit of the invention.

I claim:

1. A vacuum jar comprising a body unit including a cup-shaped sheath, a cup-shaped double walled evacuated liner having a wide mouth opening, and means for anchoring said liner in said sheath in spaced relation thereto, said means including resilient members interposed between said sheath and liner; a lid unit including a double walled evacuated closure member and a resilient member fitting around the margin of said closure member and having a portion adapted to continuously engage the mouth portion of said liner; and an inverted cup-shaped retainer mounting said lid unit and adapted to hold said lid unit upon said body unit in sealing relation and including a skirt adapted to encircle said sheath, said skirt and sheath having mating screw threads.

2. A vacuum jar comprising a body unit including a cup-shaped sheath, a cup-shaped double walled evacuated liner having a wide mouth opening, and means for anchoring said liner in said sheath in spaced relation thereto; a lid unit including a doubled walled evacuated closure member and a resilient member fitting around the margin of said closure member and having a portion adapted to continuously engage the mouth portion of said liner; and a retainer mounting said lid unit and adapted to hold said lid unit upon said body unit in sealing relation, said liner anchoring means including a locking ring removably carried by the upper open end of said sheath and a resilient ring encircling the upper end of said liner and operatively positioned by said locking ring, said retainer and locking rings having a detachable screw-threaded connection.

3. A vacuum jar comprising a body unit including a cup-shaped sheath, a cup-shaped double walled evacuated liner having a wide mouth opening, and means for anchoring said liner in said sheath in spaced relation thereto; a lid unit including a double walled evacuated closure member and a resilient member fitting around the margin of said closure member and having a portion adapted to continuously engage the mouth portion of said liner; and a retainer mounting said lid unit and adapted to hold said lid unit upon said body unit in sealing relation, said liner anchoring means including a locking ring removably carried by the upper open end of said sheath and a resilient ring encircling the upper end of said liner and operatively positioned by said locking ring, said retainer and locking ring having mating screw-threads, said liner having reduced thickness upper portion providing a shoulder on which said resilient ring bears.

4. A vacuum jar comprising a body unit including a cup-shaped sheath, a cup-shaped double walled evacuated liner having a wide mouth opening, and means for anchoring said liner in said sheath in spaced relation thereto; a lid unit including a double walled evacuated closure member and a resilient member fitting around the margin of said closure member and having a portion adapted to continuously engage the mouth portion of said liner; and a retainer detachably secured to and adapted to hold said lid unit upon said body unit in sealing relation, said liner anchoring means including a locking ring removably carried by the upper open end of said sheath and a resilient ring encircling the upper end of said liner and operatively positioned by said locking ring, said liner having a slight upward taper.

5. A vacuum jar comprising a cup-shaped body sheath, a cup-shaped hollow walled evacuated liner of a size to fit in said sheath with clearance, a plurality of resilient members interposed between said sheath and liner, one of said members constituting a ring encircling the outer marginal portion of the upper open end of said liner, a locking ring carried by the upper open end portion of said sheath and pressing against said ring, a lid unit detachably secured to said locking ring and including a hollow evacuated closure adapted to span the open end of said liner and a resilient ring marginally encircling said closure and including a portion adapted to bear upon the edge of the open end of said liner, and a retainer ring encircling said lid unit and detachably engaging said sheath to urge said lid unit into sealing engagement with said liner.

6. A vacuum jar comprising a cup shaped body sheath, a cup-shaped hollow walled evacuated liner of a size to fit in said sheath with clearance, a plurality of resilient members interposed between said sheath and liner, one of said members constituting a ring encircling the outer marginal portion of the upper open end of said liner, a locking ring carried by the upper open end portion of said sheath and pressing against said ring, a lid unit detachably secured to said locking ring and including a hollow evacuated closure adapted to span the open end of said liner and a resilient ring marginally encircling said closure and including a portion adapted to bear upon the end of the open end of said liner, and means for anchoring said lid unit upon said sheath and liner with the lid ring pressed against the open end of said liner.

7. A vacuum jar comprising a cup-shaped body sheath, a cup-shaped hollow walled evacuated liner of a size to fit in said sheath with clearance, a plurality of resilient members interposed between said sheath and liner, one of said members constituting a ring encircling the outer marginal portion of the upper open end of said liner, a locking ring carried by the upper open end portion of said sheath and pressing against said ring, a lid unit detachably secured to said sheath and including a hollow evacuated closure adapted to span the open end of said liner and a resilient ring marginally encircling said closure and including a portion adapted to bear upon the edge of the open end of said liner, said liner having an internal diameter which is substantially uniform from its bottom to its upper open end and having a reduced thickness upper end portion forming a shoulder against which said first named ring bears.

8. A vacuum jar comprising a cup-shaped body sheath, a cup-shaped hollow walled evacuated liner of a size to fit in said sheath with clearance, a plurality of resilient members interposed between said sheath and liner, one of said members constituting a ring encircling the outer marginal portion of the upper open end of said liner, a locking ring carried by the upper open end portion of said sheath and pressing against said ring, a lid unit detachably secured to said locking ring and including a hollow evacuated closure adapted to span the open end of said liner and a resilient ring marginally encircling said closure and including a portion adapted to bear upon the edge of the open end of said liner, said liner having an external surface tapering slightly inwardly toward its upper open end.

BERNICE L. NOETH.

REFERENCES CITED

The following references are of record in the file of this patent:

UNITED STATES PATENTS

| Number | Name | Date |
| --- | --- | --- |
| 1,421,325 | Walker et al. | June 27, 1922 |
| 1,730,403 | Boland | Oct. 8, 1929 |
| 1,831,663 | Hill | Nov. 10, 1931 |
| 1,963,162 | Whipple | June 19, 1934 |
| 2,324,253 | Anderson | July 13, 1943 |

FOREIGN PATENTS

| Number | Country | Date |
| --- | --- | --- |
| 848,292 | France | July 24, 1939 |